(12) United States Patent
Chen (10) Patent No.: US 7,367,591 B2
(45) Date of Patent: May 6, 2008

(54) SAFETY BELT WHICH DOESN'T KEEP CLOSE TO BODY

(76) Inventor: Xiaohua Chen, 304, Blk., 5th, TaoYuan Village, LongZhu Road, NanShan District, Shenzhen, Guangdong (CN) 518055

( * ) Notice: Subject to any disclaimer, the term of this patent is extended or adjusted under 35 U.S.C. 154(b) by 0 days.

(21) Appl. No.: 10/596,911

(22) PCT Filed: Dec. 20, 2004

(86) PCT No.: PCT/CN2004/001467

§ 371 (c)(1),
(2), (4) Date: Jun. 28, 2006

(87) PCT Pub. No.: WO2005/066000

PCT Pub. Date: Jul. 21, 2005

(65) Prior Publication Data

US 2007/0052227 A1  Mar. 8, 2007

(30) Foreign Application Priority Data

Jan. 2, 2004  (CN) .................. 2004 1 0015034
Jan. 2, 2004  (CN) .................. 2004 2 0014512 U (51) Int. Cl.
*B60R 22/36* (2006.01)
(52) U.S. Cl. .................................................. 280/806
(58) Field of Classification Search ................. 280/806, 280/807, 808; 297/480
See application file for complete search history.

(56) References Cited

U.S. PATENT DOCUMENTS 4,300,731 A * 11/1981 Kondziola ............... 242/378.4
4,624,422 A  11/1986 Hollowell
4,858,953 A  8/1989 Nishimura et al.

(Continued)

FOREIGN PATENT DOCUMENTS

CN  2313791  4/1999

(Continued)

OTHER PUBLICATIONS

Chinese Search Report for PCT/CN2004/001467.

(Continued)

*Primary Examiner*—Faye M. Fleming
(74) *Attorney, Agent, or Firm*—James B. Conte; Welsh & Katz, Ltd.

(57) ABSTRACT

A safety belt without tightly binding body includes a safety belt, a belt retractor, a flashboard, a buckle and a limiter. The limiter includes a housing having a belt inlet and outlet located at side faces thereof. An upper roller and a lower roller are provided within the housing. The lower roller is movably engaged with two lower roller supports disposed in the lower housing. A clamping sleeve is fixedly secured around the lower roller. Electromagnets are mounted to the lower roller supports, respectively. A ratchet wheel and a ratchet pawl are mounted to the lower roller. A clamping sleeve is fixedly secured around the upper roller. The upper roller is movably engaged with two upper roller supports. Springs are provided on the two upper roller supports, respectively. A ratchet wheel and a ratchet pawl are mounted to the upper roller. Electromagnets may be mounted to the bottom of the upper roller supports, respectively. A motor may be mounted within the lower housing for rotating the lower roller. The lower housing also provides an automatic or a manual limiter.

19 Claims, 8 Drawing Sheets

U.S. PATENT DOCUMENTS 6,585,295 B2 * 7/2003 Jernstrom .................. 280/806

FOREIGN PATENT DOCUMENTS

| CN | 2334211 | | 8/1999 |
|---|---|---|---|
| CN | 1241507 | A | 6/2000 |
| CN | 2570116 | | 9/2003 |
| GB | 2150419 | A | 7/1985 |
| GB | 2319502 | A | 5/1998 |
| GB | 2378926 | | 2/2003 |

OTHER PUBLICATIONS

Supplementary European Search Report—EP 04 80 2480 for sister case.

* cited by examiner

SAFETY BELT WHICH DOESN'T KEEP CLOSE TO BODY

CROSS REFERENCE TO RELATED APPLICATIONS

The present application is a national phase of PCT CN2004/001467, filed Dec. 20, 2004 claiming priority on CN 200420014512.5 and 200410015034.4, both filed Jan. 2, 2004.

FIELD OF THE INVENTION

The invention relates to a safety belt device for vehicles, more specifically, to a safety belt without tightly binding body of a passenger which can be used in high speed vehicles, such as cars or high speed trains.

TECHNICAL BACKGROUND OF THE INVENTION

A conventional safety belt device for vehicles includes a belt retractor, a safety belt, and a fastening mechanism including a flashboard and a buckle. When the flashboard is inserted into the buckle, the belt is automatically retracted by the belt retractor to make the belt tightly bind body of a passenger. However, some people would not like to use the safety belt for they feel that the belt is too tight and uncomfortable, especially when they only dress light clothing in summer. Moreover, the clothing of the passenger may be wrinkled by the belt. Furthermore, the belt tightly attached to body may influence the operation of the driver.

SUMMARY OF THE INVENTION

It is an object of the present invention to overcome the above-mentioned disadvantages by providing a safety belt device without tightly binding body which can provide not only a safety protection but also a comfortable condition for a passenger.

According to the present invention, the safety belt device without tightly binding body includes a safety belt with a flashboard 4, a belt retractor a buckle, and a limiter for adjusting the tightness of the safety belt. The limiter includes an upper and a lower housings, in which a belt inlet and a belt outlet are provided at two side faces of the housings and an upper and a lower rollers are provided at two sides of the safety belt within the housings. The lower roller is movably engaged with two lower roller supports which are disposed at a bottom surface of the lower housing. A clamping sleeve is fixedly secured around the lower roller at a center section thereof. Electromagnets are mounted to the top of the lower roller supports, respectively. A ratchet wheel is mounted to the lower roller, and a ratchet pawl engaged with the ratchet wheel and a spring attached thereto are mounted within a shelf of the lower housing. A clamping sleeve is fixedly secured around the upper roller at a center section thereof. The upper roller is movably engaged with two upper roller supports which are respectively disposed within two sliding rails fixed on the upper housing. Springs are provided between the upper housing and the two upper roller supports, respectively. A ratchet wheel is mounted at the upper roller, and a ratchet pawl engaged with the ratchet wheel and a spring attached thereto are mounted within a shelf of the upper housing. Moreover, electromagnets may be mounted at the bottom of the upper roller supports, respectively.

Moreover, a motor may be mounted within the lower housing, and an axis of the motor is connected with the lower roller through a coupling member which forms an electric-type limiter.

According to the present invention, the safety belt device without tightly binding body employs an electric-type or a manual-type limiter for adjusting the tightness of the safety belt, thereby providing quite comfort and avoiding the clothing of a passenger from being wrinkled. The safety belt of the present invention is simple in configuration and easy to install, which can be broadly used in cars, airplanes, and high speed trains.

DETAILED DESCRIPTION OF THE EMBODIMENTS

The safety belt device without tightly binding body according to the present invention will be explained below with reference to the drawings.

FIGS. 1-5 show an electric-type safety belt device of the present invention, which comprises a safety belt 2, a belt retractor 1, a flashboard 4, a buckle 5, and a limiter 3 for adjusting the degree of tightness of the safety belt 2. The limiter 3 includes an upper housing 325 and a lower housing 326. The lower housing 326 has a belt inlet 327 and a belt outlet 328 at both sides thereof, respectively. An upper roller 306 and a lower roller 303 are respectively disposed at two sides of the safety belt 2 within the upper 323 and the lower housing 326. The lower roller 303 is movably engaged with two lower roller supports 302, 324 which are disposed at a bottom surface of the lower housing 326. A clamping sleeve 301 is fixedly secured around the lower roller 303 at a center section thereof. Electromagnets 304, 323 are mounted on the top of the lower roller supports 302, 324, respectively. A ratchet wheel 322 is mounted to the lower roller 303 at an outer side of the lower roller support 324. A ratchet pawl 321 engaged with the ratchet wheel 322 and a spring 320 attached thereto are mounted within a shelf 330 of the lower housing 326. A motor 318 is mounted within the lower housing 326, in which an axis of the motor 318 is connected with the lower roller 303 through a coupling member 317.

A clamping sleeve 310 is fixedly secured around the upper roller 306 at a center section thereof. The upper roller 306 is movably engaged with two upper roller supports 307, 311 which are respectively disposed within two sliding rails 333, 332 fixed on the upper housing 325. Springs 308, 312 are provided between the upper housing 325 and the two upper roller supports 307, 311, respectively. A ratchet wheel 316 is mounted to the upper roller 303 at an outer side of the upper roller support 312, and a ratchet pawl 315 engaged with the ratchet wheel 316 and a spring 314 attached thereto are mounted within a shelf of the upper housing 325. Electromagnets 305, 313 are mounted to the bottom of the upper roller supports 307, 311, respectively.

Figure 1:
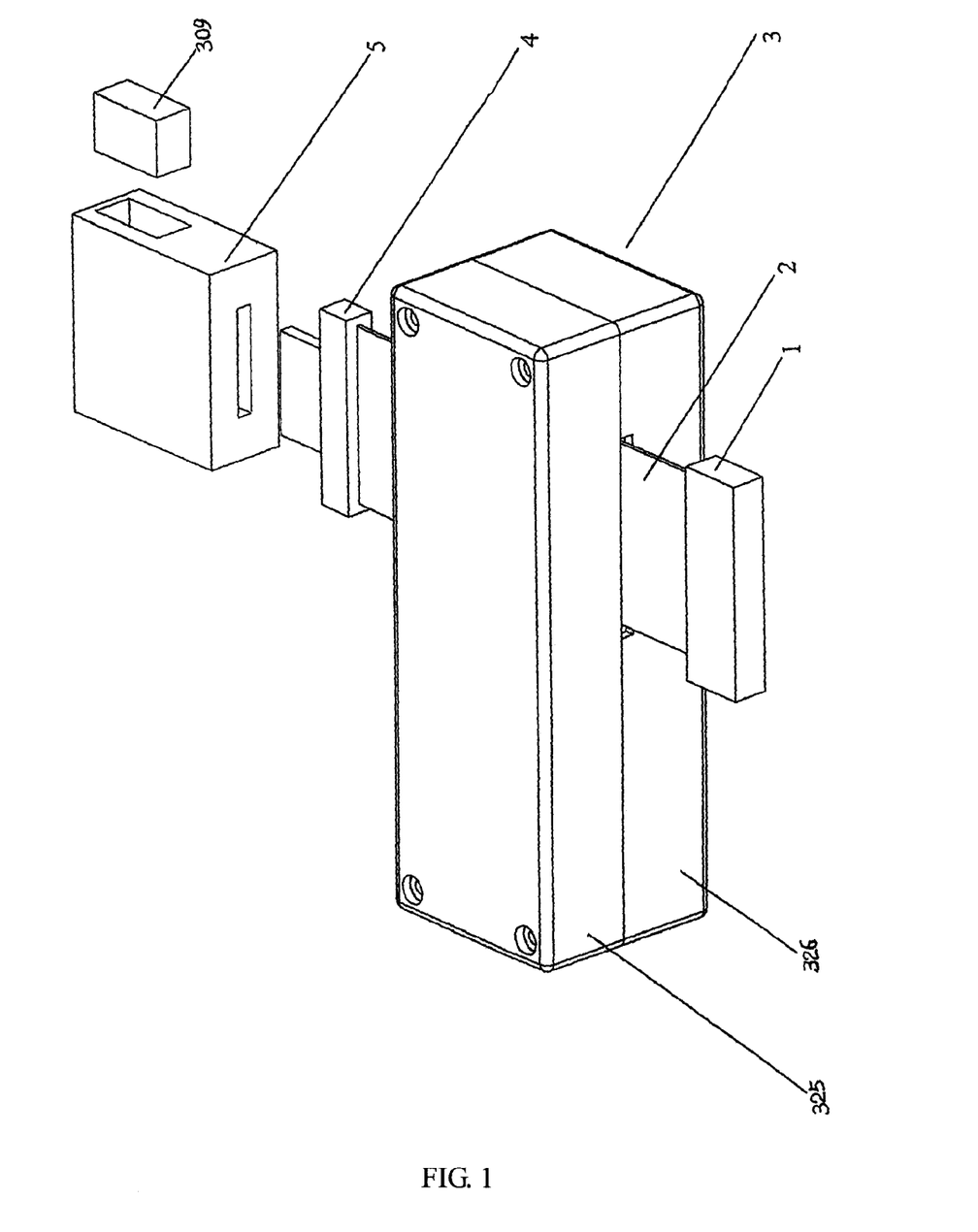
FIG. 1 shows a structural view of a safety belt device according to a first embodiment of the present invention.
Figure 2:
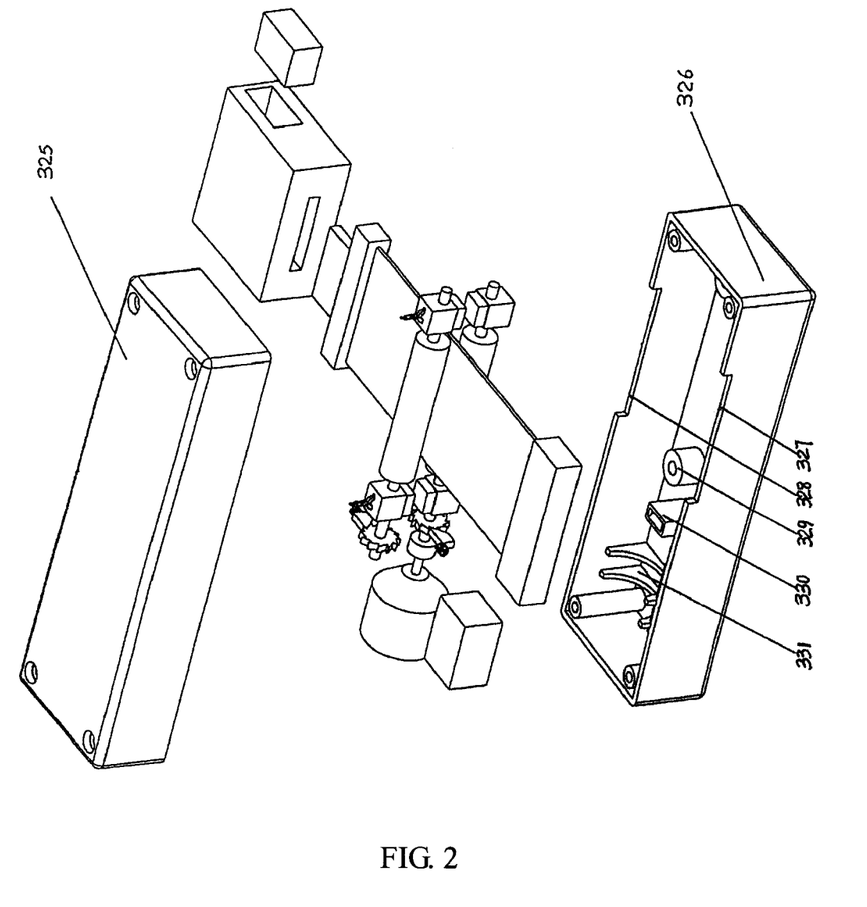
FIG. 2 shows an exploded view of the first embodiment as shown in FIG. 1.
Figure 3:
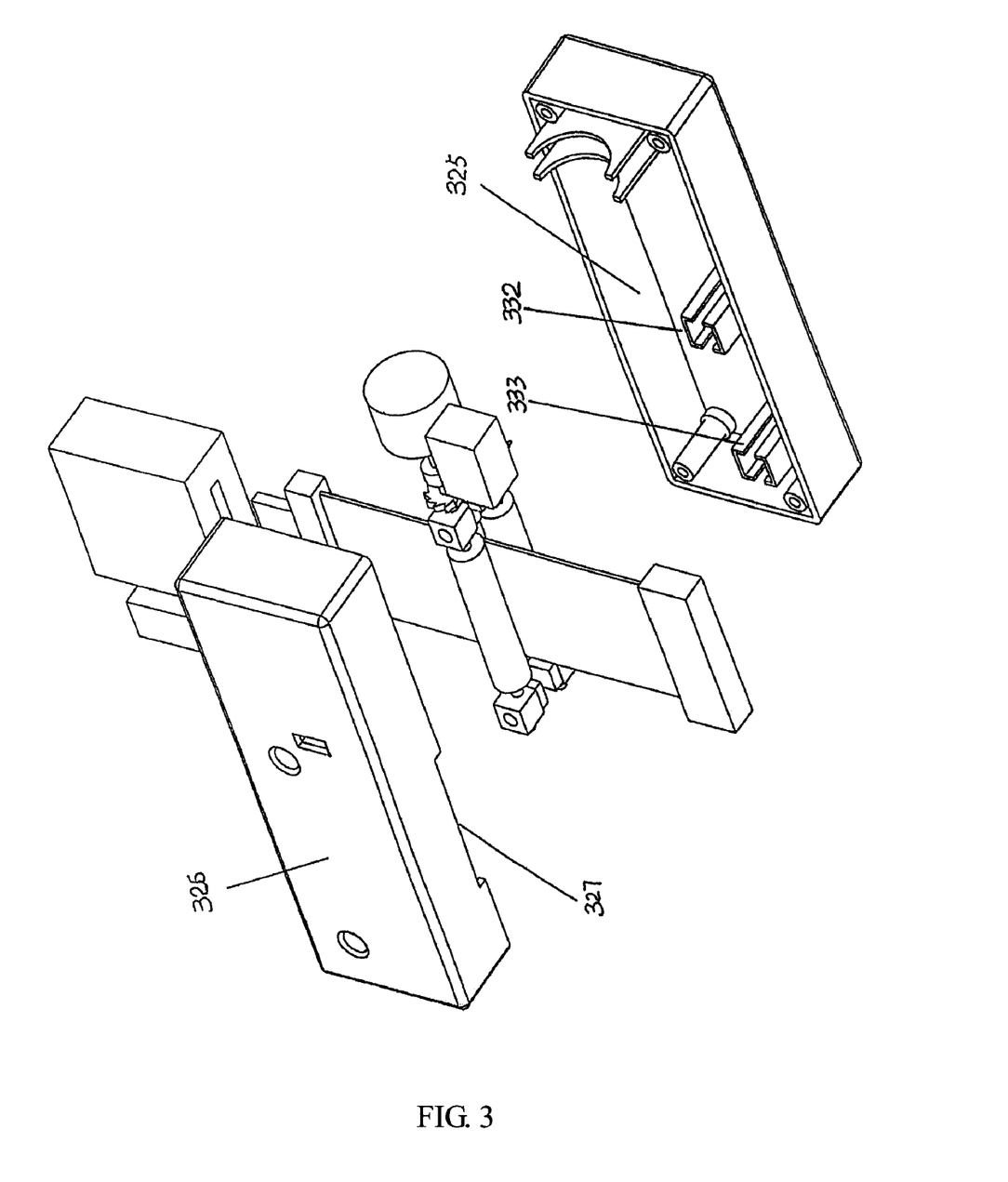
FIG. 3 shows an inverted exploded view of the first embodiment as shown in FIG. 1.
Figure 4:
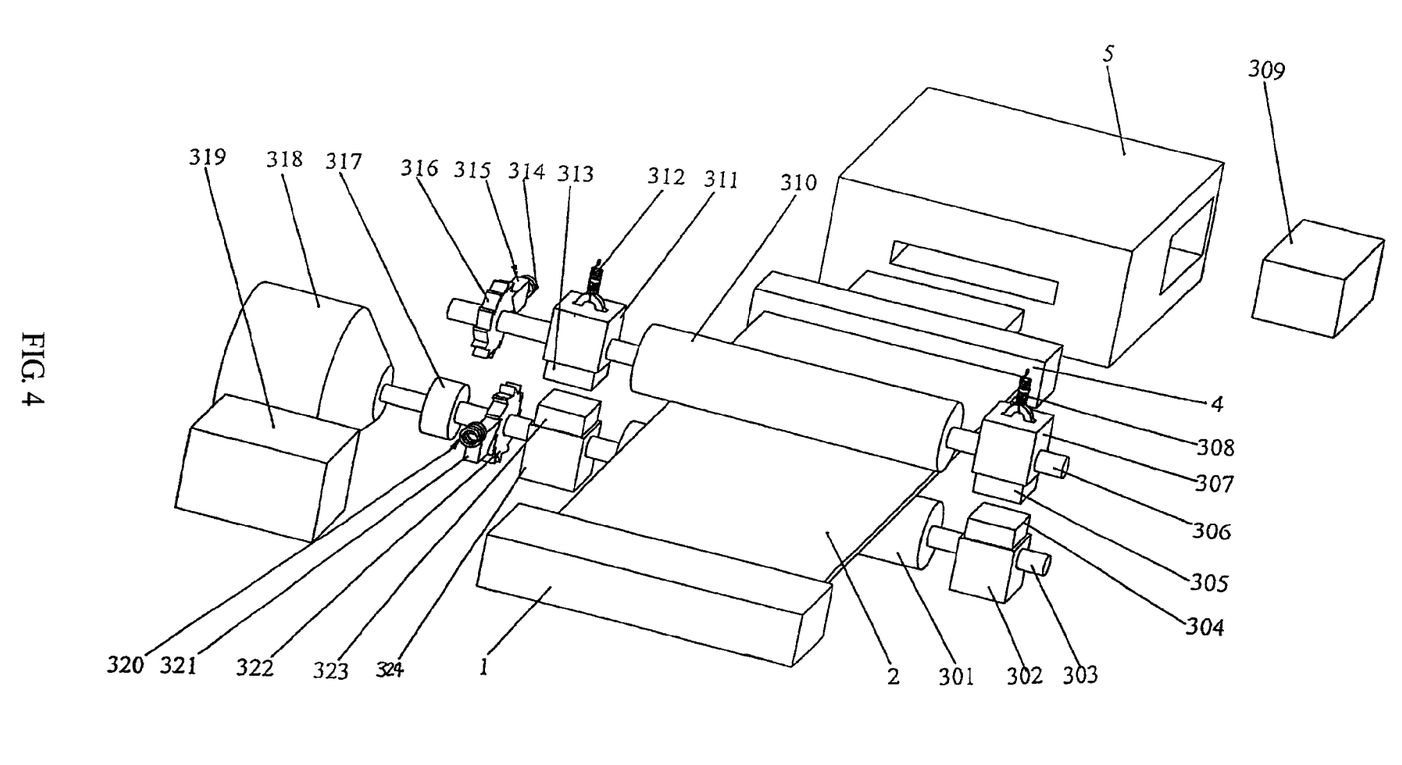
FIG. 4 is a schematic view showing a state before the limiter of FIG. 1 is initiated.

Referring to FIGS. 2, 3 and 4, a belt inlet 327 and a belt outlet 328 are provided at two side faces of the lower housing 326, respectively. A motor 318 is mounted on a motor bracket 331 disposed at an end of the lower housing 326. The lower roller supports 302, 324 are respectively fixed to two mounting bases 329 by screws. The shelf 330 for receiving the ratchet pawl 321 and the spring 320 is disposed between the motor bracket 331 and one of the mounting bases 329. Two sliding rails 332, 333 provided within the upper housing 325 are movably engaged with the upper roller supports 311, 307, respectively. Hooks for fastening the springs 308, 312 are provided at upper portions of the two sliding rails 332, 333, respectively. The upper housing is fixedly fastened to the lower housing with screws at corners thereof.

Figure 8:
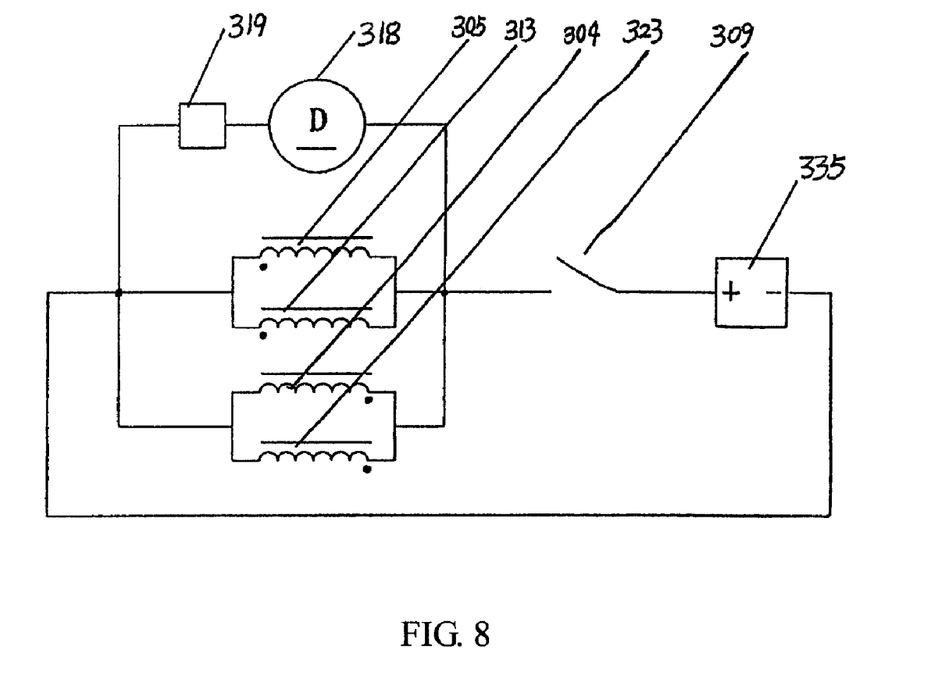
FIG. 8 is a control circuit diagram of the electric-type embodiment.

As shown in FIG. 8, the first embodiment employs an accumulator cell for supplying power. The motor 318 is serially connected with a timer 319, which forms a branch circuit. The branch circuit is connected in parallel to windings of the four electromagnets 304, 305, 313, 323 which are connected in parallel to each other, which is serially connected to the accumulator cell 335 through a power switch 309.

The power switch 309 may be mounted within the buckle 5 and controlled by the flashboard 4. The power switch 309 may be a reed switch.

According to the application, other power supplies may also be employed for the electromagnets 304, 305, 313, 323. The power switch 309 may be mounted at a place easy to be touched by a passenger, such as the vehicle seat, a side face of the upper housing 325 or the lower housing 326, or a side face of the buckle 5. The limiter 3 is mounted close to the belt retractor 1. Moreover, the belt retractor 1 may be integrally mounted within the housings of the limiter as a whole.

The working principle of the electric-type safety belt without tightly binding body is described as follows.

Figure 5:
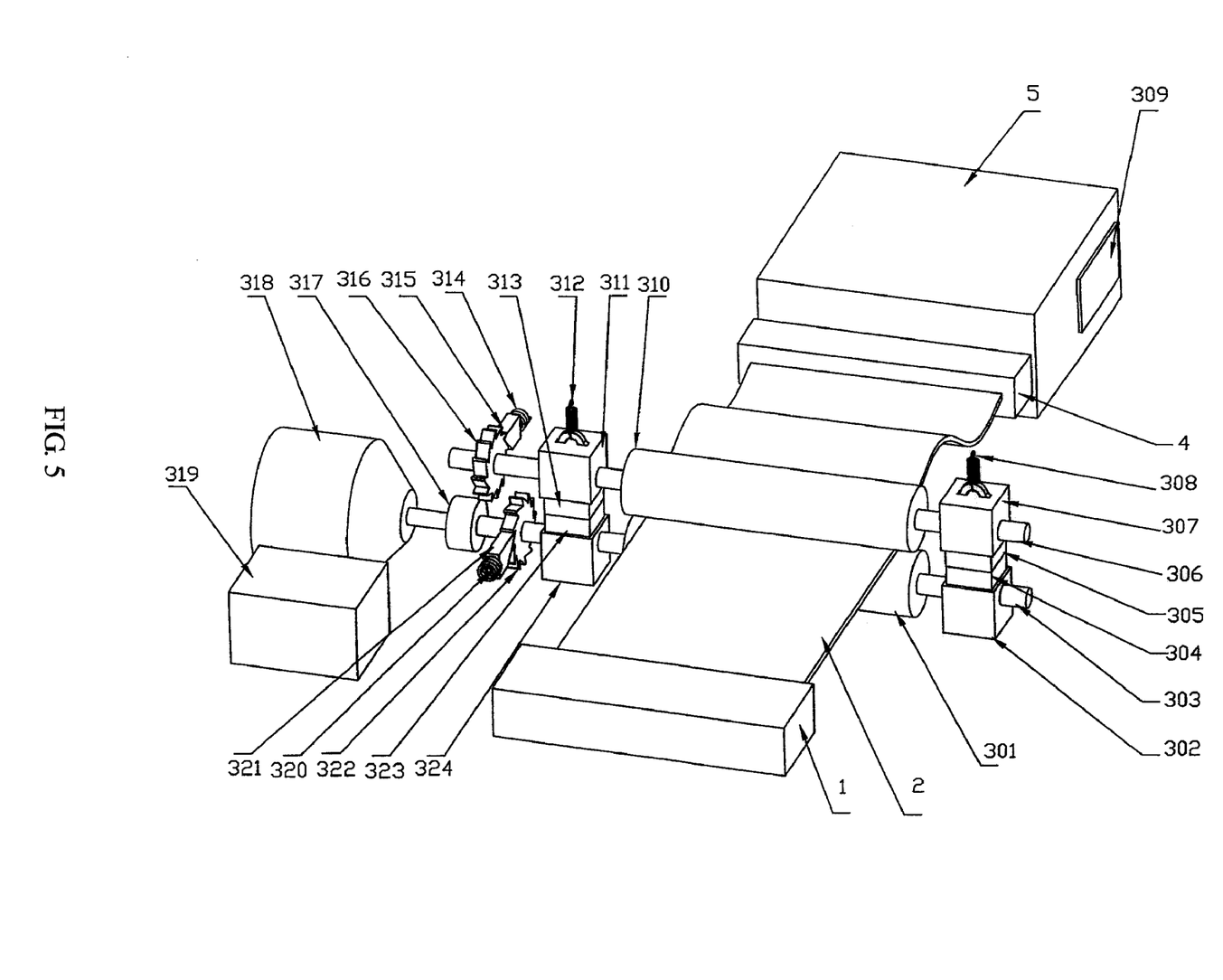
FIG. 5 is a schematic view showing that the safety belt device is in a slightly loose state after the limiter of FIG. 1 is initiated.

As shown in FIGS. 4 and 5, when the flashboard 4 provided at a head portion of the belt 2 is inserted into the buckle 5, the retractor 1 quickly tightens the belt 2 to make it tightly bind the body of the passenger. Simultaneously, the power switch 309 within the buckle 5 is turned on by the flashboard 4, so that the electromagnets 304, 305, 313, 323 are powered to generate a magnetic force. Under the magnetic force, the electromagnets 304, 323 disposed at the top of the two lower roller supports 302, 324 contact the electromagnets 305, 313 disposed at the bottom of the two upper roller supports 307, 311, thereby driving the roller 306 and two roller supports 307, 311 thereof to move down along the sliding rails 333, 332 of the upper housing 325 towards the lower roller 303, so that the belt 2 is clamped tightly.

The motor 318 is powered later than the electromagnets. After the electromagnets are powered to attract and contact with each other so as to tightly clamp the belt, the motor is powered to rotate the upper and the lower rollers 306, 303 to slightly unwind the belt 2. The rotation of the upper and the lower rollers 306, 303 is restrained by the ratchet wheel and the ratchet pawl thereof to render the upper and the lower rollers 306, 303 only to be rotated in an unwinding direction. Therefore, the unwound belt will not be tightened by the retractor 1, which ensures the belt is slightly released without influencing the safety effect thereof.

The timer 319 is used to adjust the operation time of the motor so as to control the unwinding degree of the belt 2. The timer 319 includes a delay circuit for ensuring the initiation of the motor is later than that of the electromagnets. The timer may be one chosen from various electric timers or mechanical timers in the art, such as a timer used in a washing machine.

Figure 6:
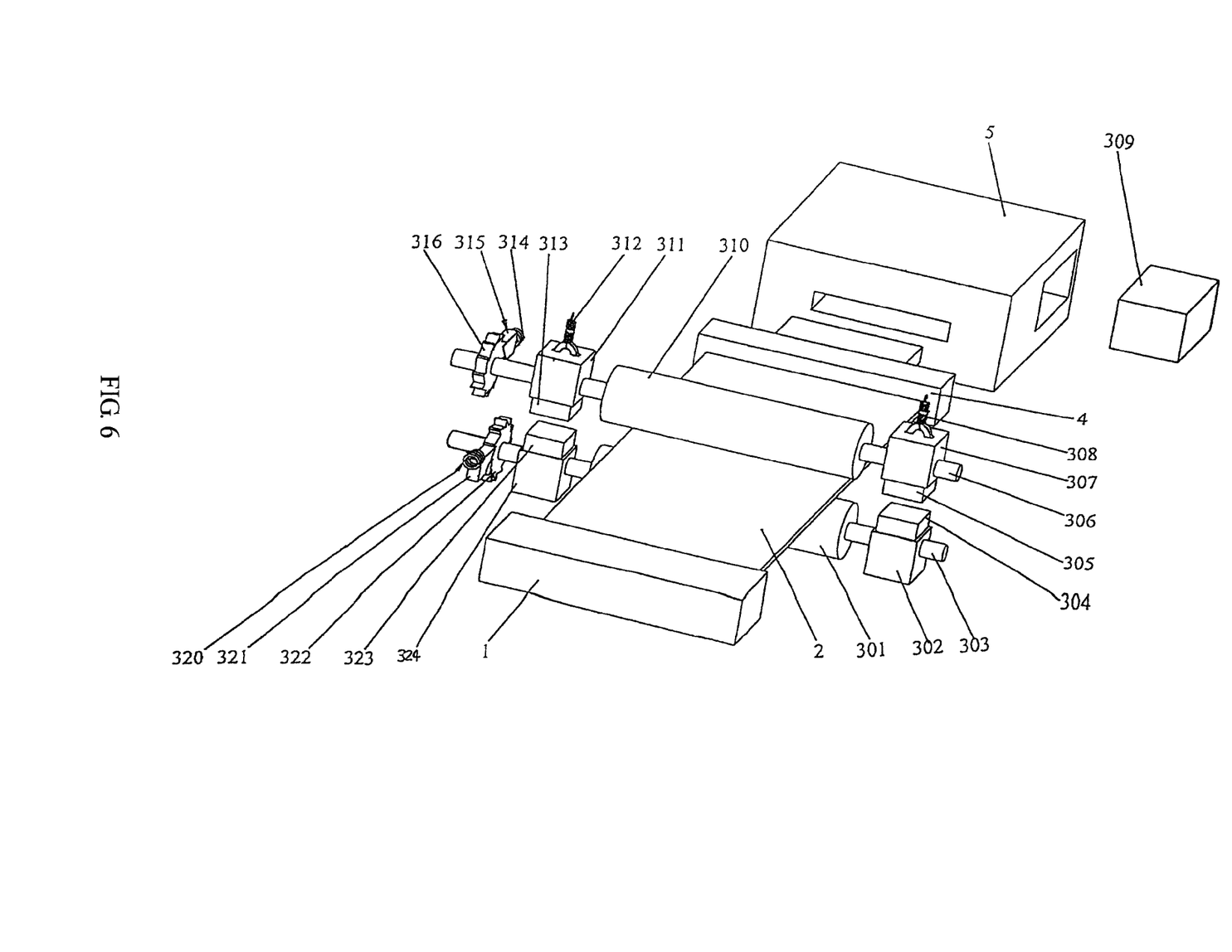
FIG. 6 is a schematic view showing a state before a manual-type limiter of a second embodiment is initiated.
Figure 7:
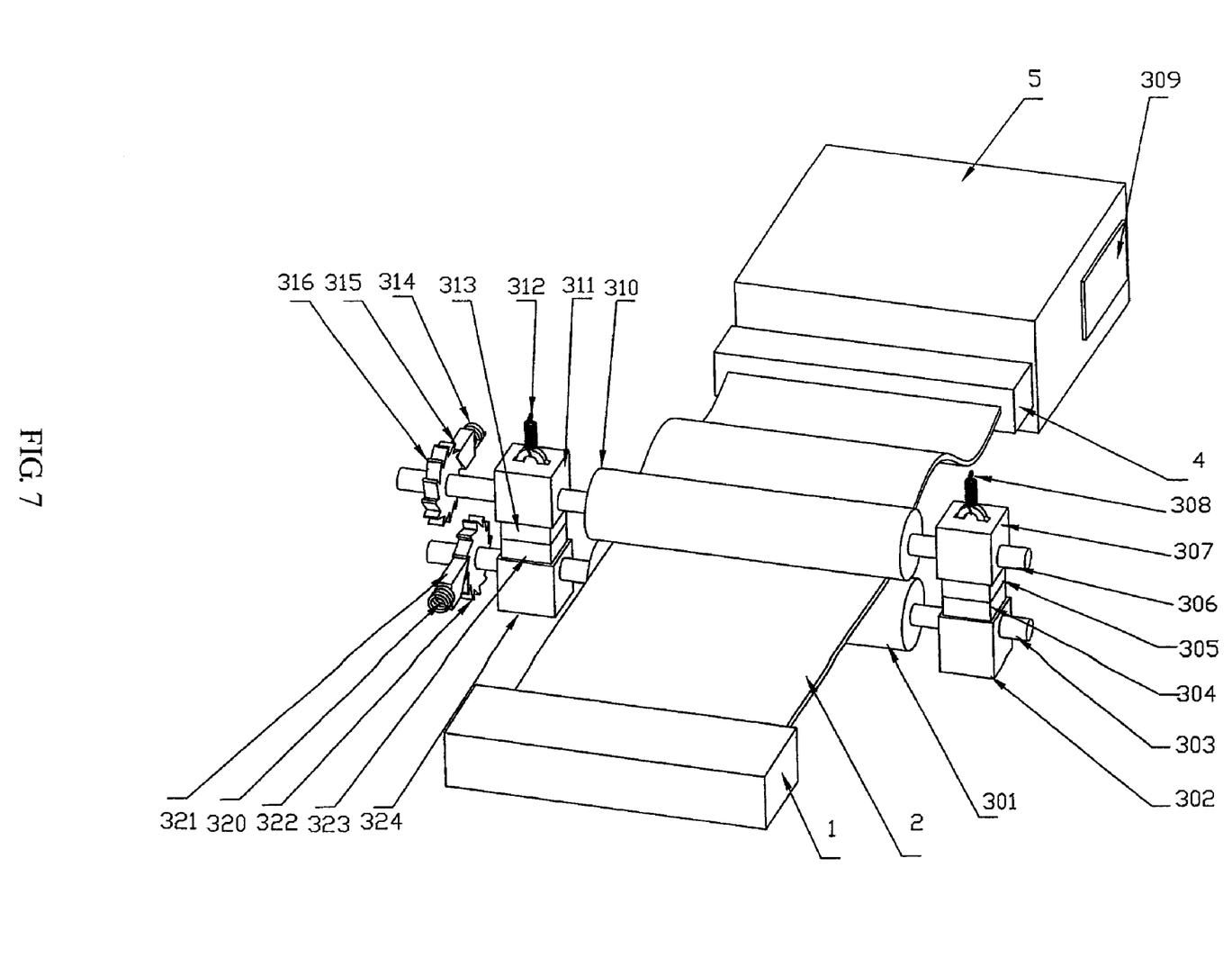
FIG. 7 is a schematic view showing that the safety belt device is in a slightly loose state after the limiter of the second embodiment is initiated.

FIGS. 6 and 7 show a manual-type safety belt device according to a second embodiment of the present invention. Compared with the first embodiment as stated above, the second embodiment does not use the DC motor 318, and the belt 2 in the second embodiment may be slightly unwound by hand. The second embodiment includes the safety belt 2, a belt retractor 1, a flashboard 4, a buckle 5, and a limiter 3 for adjusting the degree of tightness of the safety belt 2. The limiter 3 includes an upper housing 325 and a lower housing 326. The lower housing 326 has a belt inlet 327 and a belt outlet 328 at both sides thereof, respectively. An upper roller 306 and a lower roller 303 are respectively disposed at two sides of the safety belt 2 within the upper and lower housings 323, 326. The lower roller 303 is movably engaged with two lower roller supports 302, 324 which are disposed on a bottom surface of the lower housing 326. A clamping sleeve 301 is fixedly secured around the lower roller 303 at a center section thereof. Electromagnets 304, 323 are mounted at the top of the lower roller supports 302, 324, respectively. A ratchet wheel 322 is mounted to the lower roller 303 at an outer side of the lower roller support 324. A ratchet pawl 321 engaged with the ratchet wheel 322 and a spring 320 attached thereto are mounted within a shelf 330 of the lower housing 326. A clamping sleeve 310 is fixedly secured around the upper roller 306 at a center section thereof. The upper roller 306 is movably engaged with two upper roller supports 307, 311 which are respectively disposed within two sliding rails 333, 332 fixed at the upper housing 325. Springs 308, 312 are provided between the upper housing 325 and the two upper roller supports 307, 311, respectively. A ratchet wheel 316 is mounted to the upper roller 303 at an outer side of the upper roller support 312, and a ratchet pawl 315 engaged with the ratchet wheel 316 and a spring 314 attached thereto are mounted within a shelf of the upper housing 325. Electromagnets 305, 313 are mounted to the bottom of the upper roller supports 307, 311, respectively. Moreover, two lower roller supports 302, 324 may be directly mounted to the lower housing 326 or disposed within two sliding rails fixed to the lower housing 326.

Figure 9:
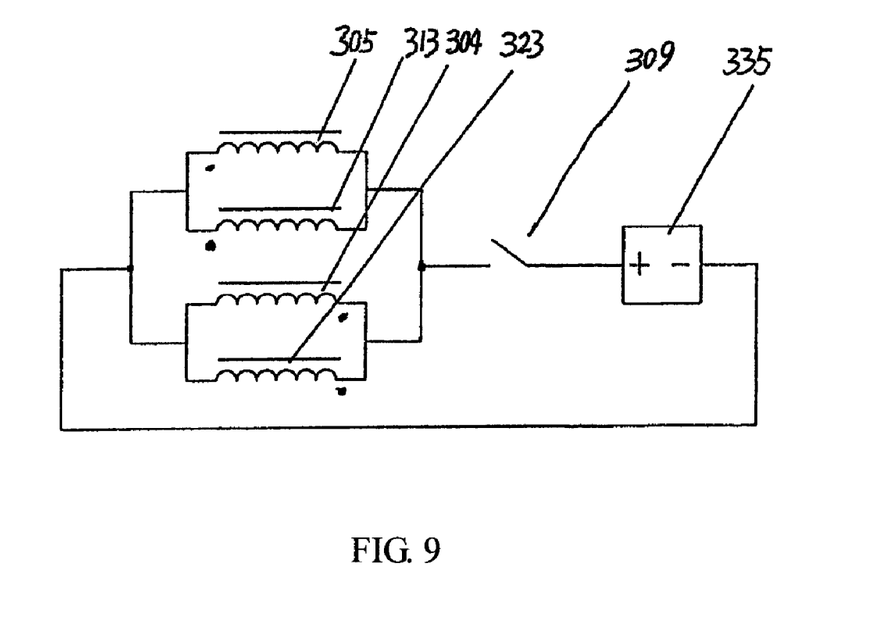
FIG. 9 is a control circuit diagram of the manual-type embodiment.

FIG. 9 shows the electronic circuit of the second embodiment. The electromagnets 304, 305, 313, 323 are energized by an accumulator cell of the vehicle. Windings of the four electromagnets 304, 305, 313, 323 which are connected in parallel to each other are connected to the accumulator cell 335 for the vehicle. The power switch 309 is serially connected between the accumulator cell 335 and the windings. The power switch 309 may be mounted within the buckle 5 and controlled by the flashboard 4. Moreover, the power switch 309 may be a reed switch.

According to the application, other power supplies may also be employed for the electromagnets 304, 305, 313, 323. The power switch 309 may be mounted at a place easy to be touched by a passenger, such as a side face of the buckle 5.

The principle of the manual-type safety belt without tightly binding body is described as follows.

As shown in FIGS. 6 and 7, when the flashboard 4 provided at a head portion of the belt 2 is inserted into the buckle 5, the retractor 1 quickly tightens the belt 2 to make it tightly bind the body of the passenger. Simultaneously, the power switch 309 within the buckle 5 is turned on by the flashboard 4, so that the electromagnets 304, 305, 313, 323 are powered to generate a magnetic force. Under the magnetic force, the electromagnets 304, 323 disposed at the top of the two lower roller supports 302, 324 contact the electromagnets 305, 313 disposed at the bottom of the two upper roller supports 307, 311, thereby driving the roller 306 and the two roller supports 307, 311 thereof to move down along the sliding rails 333, 332 of the upper housing 325 towards the lower roller 303, so that the belt 2 is clamped tightly.

In this case, the belt 2 may be slightly unwound by hand where required. Since the rotation of the upper and the lower rollers 306, 303 is restrained by the ratchet wheel and the ratchet pawl thereof, the upper and the lower rollers 306, 303 can only be rotated in an unwinding direction. The unwound belt will not be tightened by the retractor 1, which releases the tension of the belt without influencing the safety effect thereof.

It is noted that when the belt 2 is clamped between the clamping sleeves 301, 310, the friction force between the clamping sleeves 301, 310 and the belt 2 should be larger then the retracting force applied to the belt 2 by the retractor 1.

According to the present invention, the belt retractor 1 may be mounted within the housings of the limiter 3, so that the retractor 1 and the limiter 3 are integrally formed as a whole.

The invention claimed is:

1. A safety belt device without tightly binding body, comprising a safety belt with a flashboard a belt retractor, a buckle, and a limiter for adjusting the degree of tightness of the safety belt, characterized in that
   the limiter includes an upper housing and a lower housing, a belt inlet and a belt outlet being provided on two side faces of the housings,
   an upper roller and a lower roller are provided at two sides of the safety belt within the housings,
   at least one of the upper and the lower rollers being movable in a direction close to the other roller;
   clamping sleeves are fixedly secured around the lower roller and the upper roller, respectively, so that the safety belt is clamped between the clamping sleeves as the rollers move close to each other:and
   the upper roller and the lower roller are configured to be rotatable in a belt-unwinding direction to allow the belt to be pulled out.

2. The safety belt device of claim 1 wherein the belt retractor is mounted within the housings of the limiter.

3. The safety belt device of claim 1, wherein electromagnets are respectively mounted on two lower roller supports of the lower roller, and the electromagnets are controlled to attract two upper roller supports of the upper roller to drive the rollers to move towards each other.

4. The safety belt device of claim 3, wherein the upper roller supports of the upper roller are movably disposed within two slide rails of the upper housing, respectively, and springs are provided between the upper housing and the upper roller supports, respectively.

5. The safety belt device of claim 3, wherein ratchet wheels are fixedly mounted to the lower roller and the upper roller, respectively, and each ratchet wheel is engaged to a ratchet pawl which allows the rollers to rotate in the belt-unwinding direction and blocks the rollers to rotate in an opposite belt-winding direction.

6. The safety belt device of claim 5, wherein electromagnets are respectively mounted to the upper roller supports of the upper roller corresponding to the electromagnets mounted on the lower roller.

7. The safety belt device of claim 6, wherein the electromagnets are connected in parallel with each other and then connected between two terminals of an accumulator cell, and a power switch is serially connected between the electromagnets and the accumulator cell.

8. The safety belt device of claim 7, wherein the power switch is mounted within the buckle and controlled by the flashboard.

9. The safety belt device of claim 6, wherein a motor is mounted within the lower housing, and an axis of the motor is connected with the lower roller through a coupling member.

10. The safety belt device of claim 9, wherein a branch circuit including the motor and a timer which is serially connected with the motor, is connected in parallel to windings of the electromagnets which are connected in parallel to each other, and is then connected to an accumulator cell through a power switch.

11. The safety belt device of claim 10, wherein the power switch is mounted within the buckle and controlled by the flashboard.

12. The safety belt device of claim 10, wherein the power switch is a reed switch.

13. The safety belt device of claim 3, wherein the electromagnets are connected in parallel with each other and then connected between two terminals of an accumulator cell, and a power switch is serially connected between the electromagnets and the accumulator cell.

14. The safety belt device of claim 13, wherein the power switch is mounted within the buckle and controlled by the flashboard.

15. The safety belt device of claim 3, wherein a motor is mounted within the lower housing, and an axis of the motor is connected with the lower roller through a coupling member.

16. The safety belt device of claim 15, wherein a branch circuit including the motor and a timer which is serially connected with the motor, is connected in parallel to windings of the electromagnets which are connected in parallel to each other, and is then connected to an accumulator cell through a power switch.

17. The safety belt device of claim 16, wherein the power switch is mounted within the buckle and controlled by the flashboard.

18. The safety belt device of claim 17, wherein the power switch is a reed switch.

19. The safety belt device of claim 1, wherein the device is configured to provide a friction force between the clamping sleeves and the belt larger than a retracting force applied to the belt by the retractor.

* * * * *